United States Patent
Raissinia et al.

(10) Patent No.: US 7,668,101 B1
(45) Date of Patent: *Feb. 23, 2010

(54) ARQ IN A POINT TO MULTIPOINT NETWORK

(75) Inventors: Alireza Raissinia, Monte Sereno, CA (US); Vincent K. Jones, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 602 days.

This patent is subject to a terminal disclaimer.

(21) Appl. No.: 11/374,454

(22) Filed: Mar. 13, 2006

Related U.S. Application Data (63) Continuation of application No. 09/823,142, filed on Mar. 29, 2001, now Pat. No. 7,085,232.

(51) Int. Cl.
*H04L 12/26* (2006.01)
(52) U.S. Cl. ...................................... 370/235
(58) Field of Classification Search ........................ None
See application file for complete search history.

(56) References Cited

U.S. PATENT DOCUMENTS

| | | |
|---|---|---|
| 5,629,948 A | 5/1997 | Hagiwara et al. |
| 5,784,362 A | 7/1998 | Turina |
| 5,870,406 A | 2/1999 | Ramesh et al. |
| 6,069,901 A | 5/2000 | Hulyalkar et al. |
| 6,212,240 B1 | 4/2001 | Scheibel et al. |
| 6,615,382 B1 | 9/2003 | Kang et al. |
| 6,963,541 B1 | 11/2005 | Vogel et al. |
| 7,085,232 B1 * | 8/2006 | Raissinia et al. ............ 370/235 |
| 2002/0036985 A1 | 3/2002 | Jonas et al. |
| 2002/0052205 A1 | 5/2002 | Belostotsky et al. |
| 2002/0080868 A1 | 6/2002 | Bunn et al. |
| 2005/0204252 A1 | 9/2005 | Aramaki et al. |

OTHER PUBLICATIONS

Data-Over-Cable Service Interface Specifications, Radio Frequency Interface Specification, SP-RF1v1.1-106-001215, Cabole Television Laboratories, Inc., 2000.

* cited by examiner

*Primary Examiner*—Anh-Vu Ly
(74) *Attorney, Agent, or Firm*—Cindy Kaplan (57) ABSTRACT

The systems and methods for incorporating an automatic retransmission mechanism into a point to multipoint network MAC layer that does not already incorporate retransmission are provided by virtue of one embodiment of the present invention. For example, the DOCSIS MAC layer protocol developed for data over cable networks may be modified to incorporate an automatic retransmission mechanism. This allows DOCSIS to be applied more effectively to communication channels such as the wireless communication channel.

14 Claims, 6 Drawing Sheets

ARQ IN A POINT TO MULTIPOINT NETWORK

RELATED APPLICATION

This patent application is a continuation of U.S. patent application Ser. No. 09/823,142, filed Mar. 29, 2001, which is incorporated herein by reference in its entirety.

BACKGROUND OF THE INVENTION

The present invention is relates to data communications and more particularly to systems and methods for improving the performance of point to multipoint networks.

A point to multipoint wireless communication system represents a potentially effective solution to the problem of providing broadband network connectivity to a large number of geographically distributed points. Unlike optical fiber, DSL and cable modems, there is no need to either construct a new wired infrastructure or substantially modify a wired infrastructure that has been constructed for a different purpose. In a typical wireless point to multipoint network design, there is a central access point that provides connectivity to the Internet backbone and numerous subscriber units that interact directly with the central access point. Communication from the head end or central access point to the individual subscriber units is referred to as downstream communication. Communication from a subscriber unit to the central access point is referred to as upstream communication.

In one scenario, upstream and downstream communications use different frequencies. A time division multiple access (TDMA) scheme may be used to divide access to the upstream communication channel among the various subscriber units.

Except for the physical medium, the wireless point to multipoint network architecture just described is in fact very similar to the architecture of a cable modem network as defined by the DOCSIS standard promulgated by Cable Television Laboratories, Inc. In order to take advantage of the large body of experience in operating cable modem networks and further to be able to employ components already developed for cable modem networks, it is desirable to adapt at least the media access contention (MAC) layer portion of the DOCSIS protocol to the wireless point to multipoint network while employing a physical layer that is suitable for wireless applications. The physical wireless communication channel generally represents a greater challenge than the cable channel due to noise, interference and greater multipath effects. Adapting DOCSIS to the wireless environment involves in part using a more robust physical layer such as one based on OFDM (orthogonal frequency division multiplexing).

Network protocols designed from the start for wireless communication often include a mechanism referred to as "ARQ" that provides for acknowledgment of successfully transmitted information and retransmission where there is no such acknowledgment. ARQ increases the performance of wireless communication networks in challenging channel conditions because the odds of successive transmission are greatly increased if multiple attempts are permitted. Unfortunately, DOCSIS makes no provision for ARQ in its MAC layer design. Furthermore, it is very cumbersome to include ARQ at the physical layer and still take advantage of DOCSIS MAC layer components. What is needed are systems and methods for adapting ARQ to the DOCSIS MAC layer while making minimal changes to the DOCSIS protocol.

SUMMARY OF THE INVENTION

Systems and methods for incorporating an automatic retransmission mechanism into a point to multipoint network MAC layer that does not already incorporate retransmission are provided by virtue of one embodiment of the present invention. For example, the DOCSIS MAC layer protocol developed for data over cable networks may be modified to incorporate an automatic retransmission mechanism. This allows DOCSIS to more effectively handle challenging communication channels such as the wireless communication channel.

A first aspect of the present invention provides a method of operating a subscriber unit in a point to multipoint network operating according to a DOCSIS-based MAC protocol. The method includes transmitting data to a central access point during a directed grant slot allocated to the subscriber unit, monitoring MAP messages broadcast by the central access point to detect acknowledgment of receipt of the data, and if no acknowledgement of receipt is indicated by the MAP messages, retransmitting the data.

A second aspect of the present invention provides a method of operating a central access point in a point to multipoint network operating according to a DOCSIS-based MAC protocol. The method includes receiving data from a subscriber unit during a directed grant slot allocated to the subscriber unit and broadcasting a MAP message that includes an acknowledgment of receipt of the data.

Further understanding of the nature and advantages of the invention herein may be realized by reference to the remaining portions of the specification and the attached drawings.

DESCRIPTION OF SPECIFIC EMBODIMENTS

Figure 1:
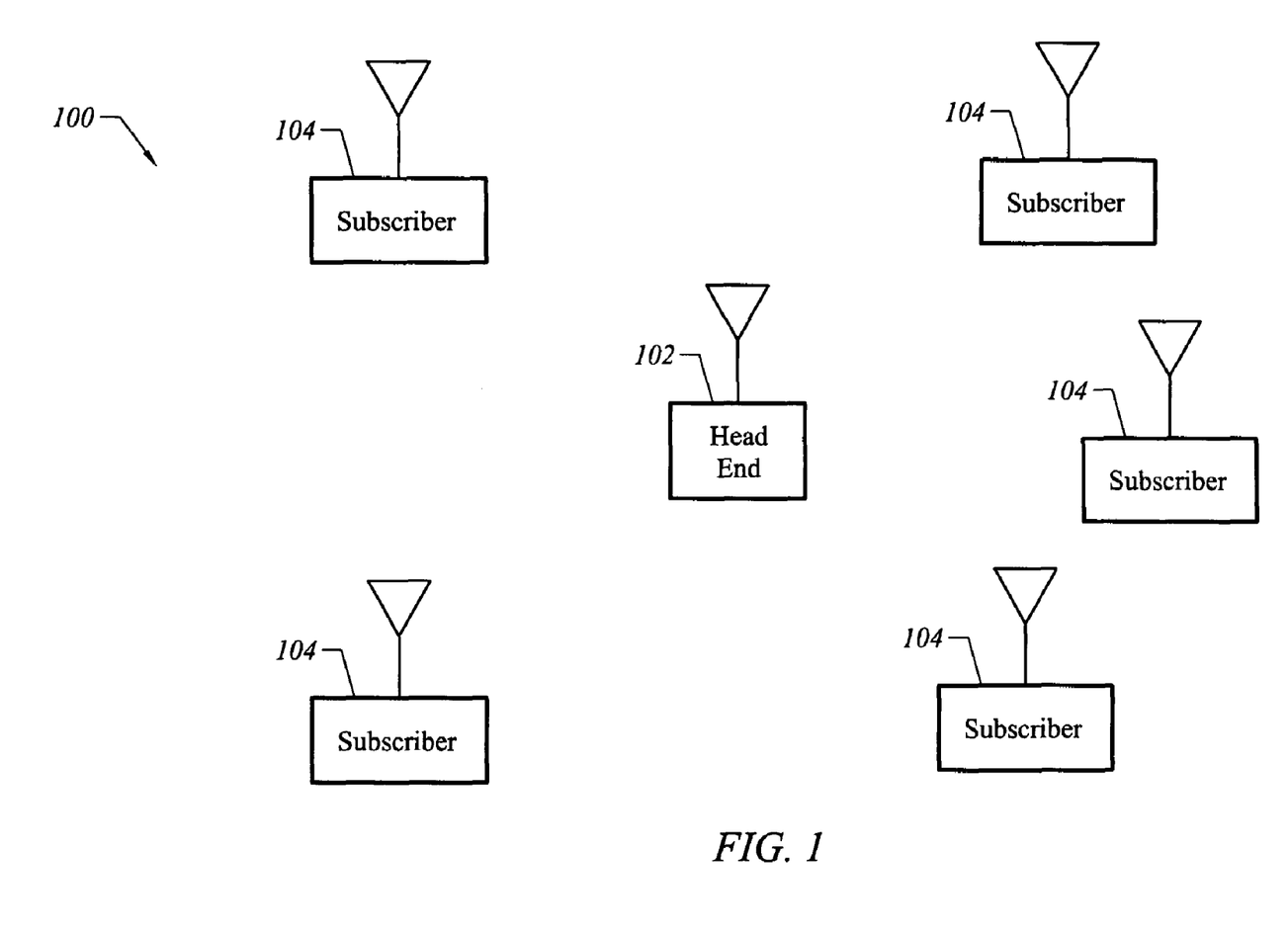
FIG. 1 depicts a point to multipoint network according to one embodiment of the present invention.

FIG. 1 depicts a point to multipoint wireless communication network 100 suitable for implementing one embodiment of the present invention. The present invention is, however, not limited to wireless networks. Network 100 includes a central access point or head end 102 and multiple subscriber units 104. All communication is typically either to or from central access point 102. Communication from central access point 102 to one or more subscriber units 104 is herein referred to as downstream communication. Communication from any one of subscriber units 104 to central access point 102 is herein referred to as upstream communication. In one embodiment, different frequencies are allocated to upstream and downstream communication. This is referred to as frequency division duplexing (FDD). Alternatively, time division duplexing (TDD) may be employed where upstream and downstream communications share the same frequencies.

Each of one or more upstream frequencies is common to multiple subscriber units. A media access control (MAC) protocol is provided to control access by the subscriber units to the shared medium. One type of such protocol is referred to as time division multiple access (TDMA). In a TDMA protocol, the time domain is divided into frames or slots.

An example of a TDMA MAC protocol is the DOCSIS v1.1 standard which was developed for data over cable networks. The DOCSIS v1.1 standard is defined by the Data-Over-Cable Service Interface Specifications, Radio Frequency Interface Specification SP-RFIv 1.1-I06-001215 published by the Cable Television Laboratories, Inc. in 2000, the contents of which are incorporated herein by reference in their entirety.

Among the types of upstream transmission slots supported by DOCSIS are "request/data" slots and "data grant" slots. The data grant slots are reserved for particular subscriber units and are referred to herein as "directed" grant slots. During any directed grant slot only one subscriber unit may transmit. Multiple subscriber units are permitted to transmit during a request/data slot. A collision may result from simultaneous transmission by multiple subscriber units so DOCSIS provides that upstream transmissions during request/data slots are acknowledged so that a subscriber unit knows that it need not repeat its transmission. Typically, the request/data slot is used to request a reserved data grant slot rather than for upstream transmission of higher layer data.

In order to coordinate the upstream transmissions of subscriber units, the central access point periodically transmits scheduling messages downstream that are referred to as "MAP" messages. A MAP message includes a series of information elements that identify and characterize upstream time slots. The information element for a time slot will identify the type of time slot (request/data, directed grant, etc.), the precise time of the time slot and for time slots reserved for particular subscriber units, an identifier identifying the subscriber unit and MAC layer service on that subscriber unit for which the time slot has been reserved. The MAP messages also include acknowledgments of data packets received during any request/data time slots since the previous MAP message, as well as a time stamp indicative of the latest time slot for which successful receipt of a data packet during that time slot will have been acknowledged.

In order to improve the robustness of the DOCSIS MAC layer under difficult physical layer channel conditions, it is desirable to provide a mechanism for retransmitting data packets that have been unsuccessfully transmitted in directed grant slots. DOCSIS provides no acknowledgment mechanism for such unsuccessfully transmitted packets. According to one embodiment of the present invention, an acknowledgment and automatic retransmission mechanism may be added to DOCSIS v1.1 by having central access point 102 acknowledge successfully received packets in directed grant slots using the same acknowledgement mechanism provided for data transmitted upstream during request/data slots.

The DOCSIS MAC layer entity at central access point 102 is modified so that acknowledgments for the packets received during directed grant slots are included in the MAP message. The subscriber unit DOCSIS MAC layer entity is modified so that data transmitted upstream during directed grant slots is stored after transmission and retransmitted if no acknowledgment is received prior to receipt of a MAP message having a time stamp later than the directed grant slot used for the initial transmission. This acknowledgement and retransmission or ARQ mechanism is preferably applied only to data traffic that can tolerate the greater latency inherent in retransmission. Thus, ARQ might not be applied to real time data streams such as voice and/or streaming video traffic.

Figure 2:
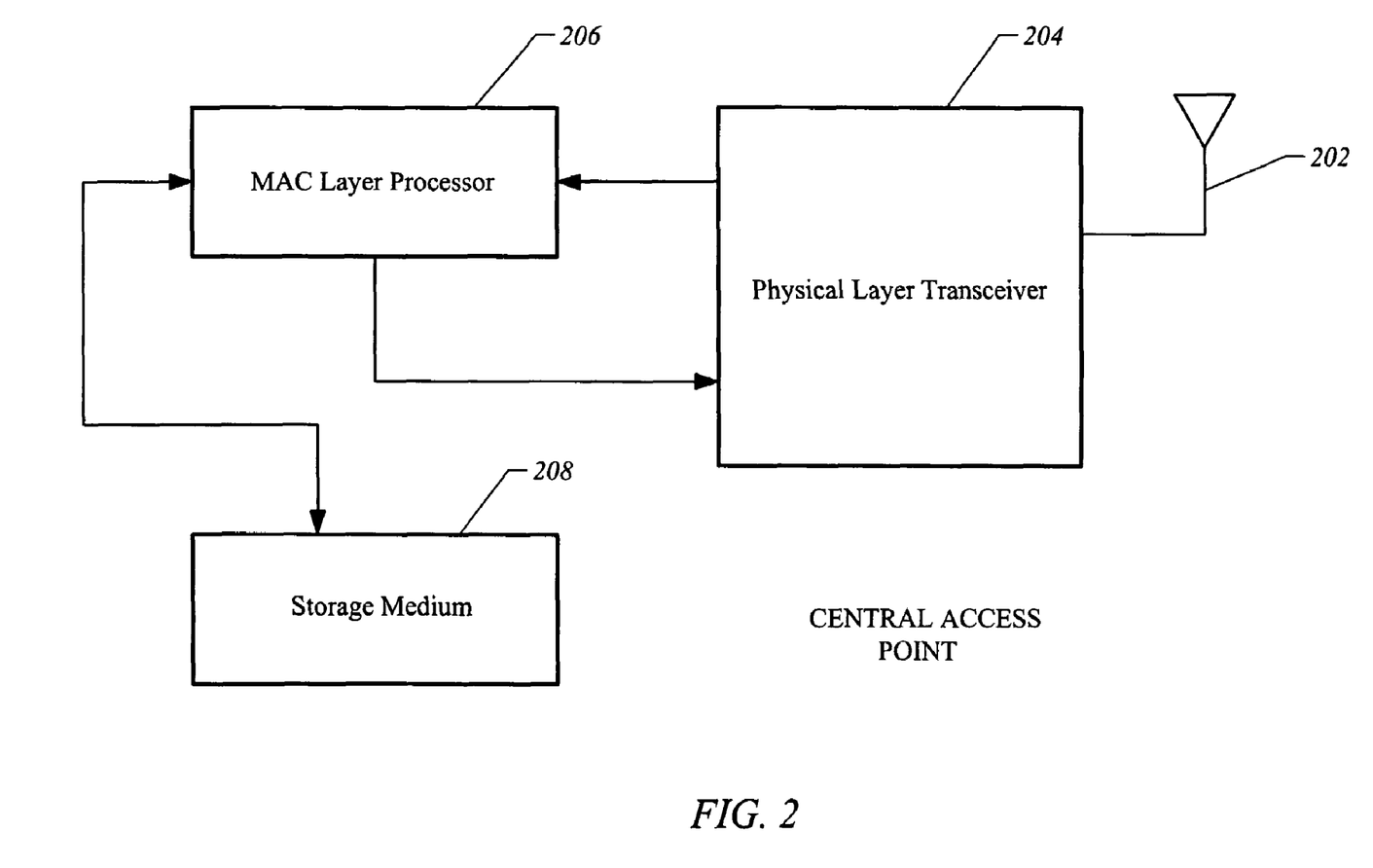
FIG. 2 depicts a subscriber unit according to one embodiment of the present invention.

FIG. 2 depicts central access point 102 according to one embodiment of the present invention. An antenna 202 picks up and sends signals via the airwaves. A physical layer transceiver 204 acts as a wireless modem. Physical layer transceiver 204 includes analog functionality such as amplification, filtering, conversion between the radio frequency (RF) used for transmission and reception over the airwaves and an intermediate frequency (IF), conversion between the IF and base band, conversion between analog and digital signals, digital filtering, error correction coding and decoding, conversion between bits and data symbols used for communication, interleaving and deinterleaving, etc. Physical layer transceiver 204 may also include signal processing functionality to support orthogonal frequency division multiplexing (OFDM) as well as signal processing to take advantage of the use of multiple antennas for optimal transmission and/or reception. As a part of its error correction decoding function, physical layer transceiver 204 can determine if a data packet has been correctly received.

A MAC layer processor 206 implements the central access point MAC layer functionality defined by the DOCSIS v1.1 specification cited above as modified to implement the ARQ capability provided by the present invention. MAC layer processor 206 processes access requests, grants transmission slots, formulates and transmits MAP messages, etc.

MAC layer processor 206 may be implemented entirely in hardware but also may rely on instructions from a machine-readable medium for at least a part of its operation. A computer readable storage medium 208 is depicted and may include program instructions, state information, etc. for performing any of the functions described herein. Examples of machine readable media include, but are not limited to, magnetic media such as hard disks, floppy disks, and magnetic tape; optical media such as CD-ROM disks; magneto-optical media such as optical disks; and hardware devices specially configured to store and program instructions, such as read only memory devices (ROM) and random access memory (RAM). Examples of program instructions include both machine codes such as produced by a compiler and files containing a higher-level code that may be executed using an interpreter.

Figure 3:
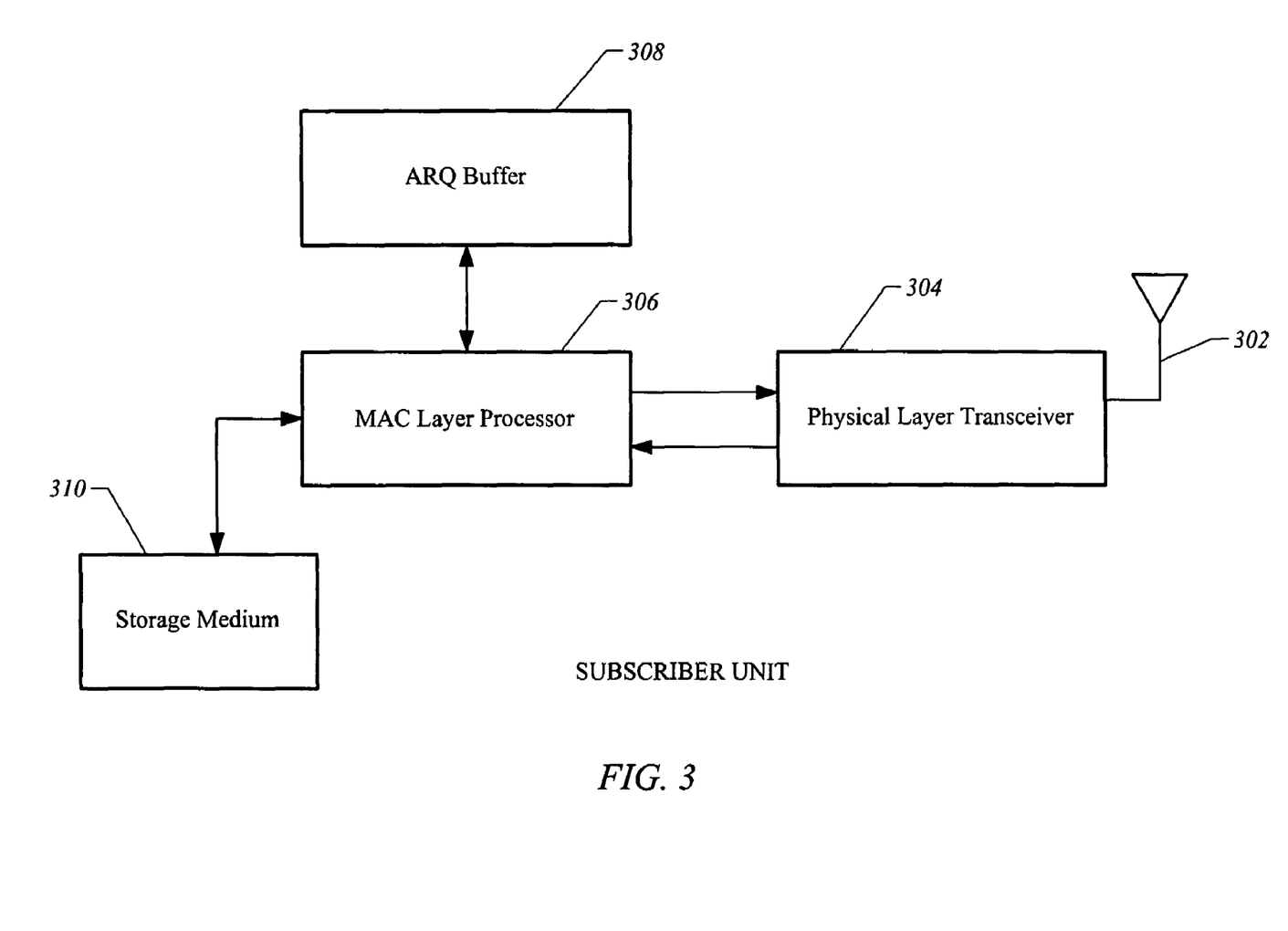
FIG. 3 depicts a central access point according to one embodiment of the present invention.

FIG. 3 depicts subscriber unit 104 according to one embodiment of the present invention. Signals are exchanged with the airwaves via antenna 302. A physical layer transceiver 304 performs functions analogous to those of physical layer transceiver 204 within central access point 102. A MAC layer processor 306 performs the DOCSIS v1.1 MAC layer functionality substantially as specified for subscriber units and modified to incorporate the ARQ functionality provided by the present invention. An ARQ buffer 308 is provided to store data packets that have already been transmitted to allow for retransmission when no acknowledgement is received. A storage medium 310 may store instructions for the operation of MAC layer processor 306 and may be implemented in any of the ways described with reference to storage medium 208.

To facilitate the description of ARQ operation in the DOCSIS context, it will be helpful to briefly explain the concept of DOCSIS service flows. To support streaming applications, DOCSIS provides for multiple "service flows" where each service flow is a unidirectional flow of packets that is provided a particular quality of service. For example, at a particular subscriber unit, a first upstream service flow may be employed for web-related data while a second upstream service flow may be used for a voice call. Each service flow has an associated subscriber identifier (SID) value. When allocating time slots, central access point 102 specifies the service flow that should transmit upstream during each allocated time slot.

Figure 4:
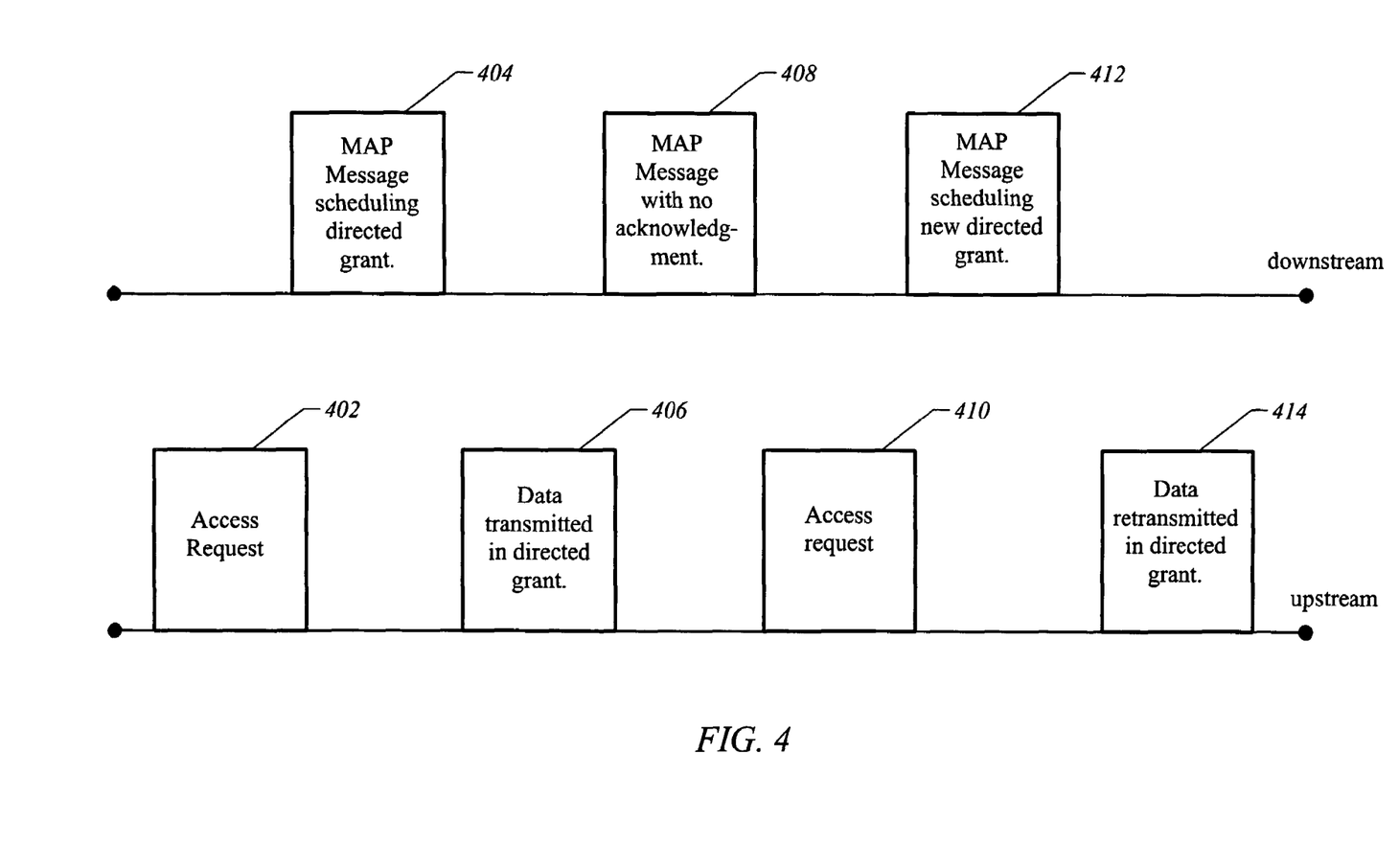
FIG. 4 depicts message flow according to one embodiment of the present invention.

FIG. 4 depicts upstream and downstream message flow according to one embodiment of the present invention. The top horizontal axis of FIG. 4 depicts representative downstream messages. The bottom horizontal axis depicts representative upstream messages. The horizontal dimension corresponds to time but the width of individual time slots is not drawn to scale with the spacing between the slots.

FIG. 4 depicts a scenario where a subscriber unit 104 transmits a data packet upstream to the central access point, the data is not received successfully by the central access point, and the subscriber unit retransmits after noting the missing acknowledgment. A data/request time slot is used to transmit an access request 402 upstream from the subscriber unit 104 to central access point 102. In response, central access point 102 in its next MAP message 404 includes an information element identifying a directed grant slot reserved for the requesting subscriber unit 104. The subscriber unit 104 transmits the data packet upstream in message 406 during the reserved directed grant slot. Due to a channel impairment such as noise and/or interference, this data packet is not successfully received by the central access point. Accordingly, a MAP message 408 following the directed grant slot does not include an acknowledgment of successful receipt and has a time stamp that is later than the directed grant time slot.

Based on an inspection of the contents of MAP message 408, the subscriber unit 104 recognizes that message 406 has not been successfully received. Accordingly, it again requests access in a message 410. Central access point 102 responds by including an information element scheduling a new directed grant slot in a MAP message 412. Then the data packet is retransmitted in a message 414 that occupies the reserved directed grant slot.

Figure 5:
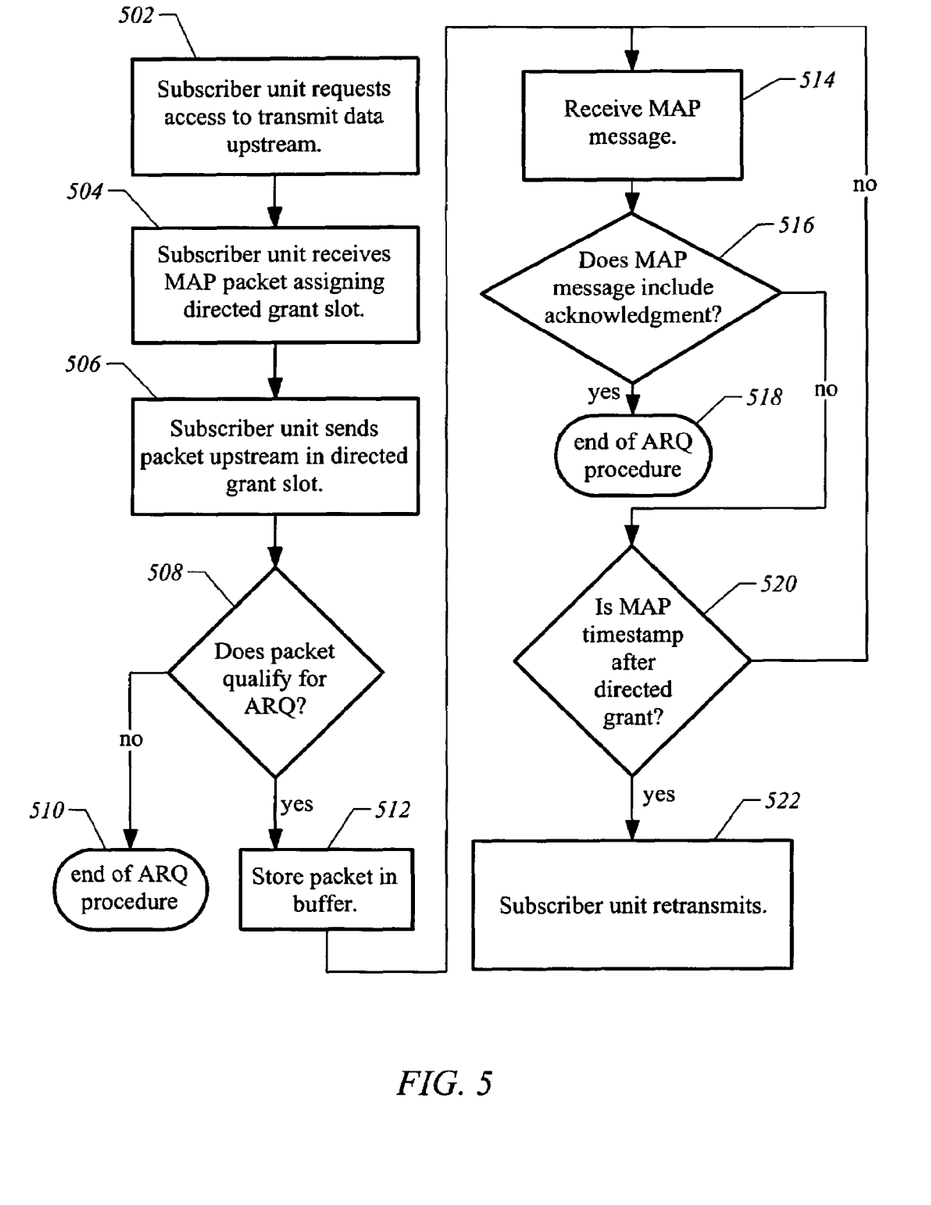
FIG. 5 is a flowchart describing steps of operating an ARQ scheme in a subscriber unit according to one embodiment of the present invention.

FIG. 5 is a flow chart describing steps of implementing an ARQ scheme in a subscriber unit according to one embodiment of the present invention. At step 502, a service flow operating on subscriber unit 104 requests access to transmit data upstream. At step 504, this service flow receives a MAP message assigning it a directed grant slot to transmit this data upstream. Then, at step 506, the subscriber unit 104 sends the packet belonging to this service flow upstream during the directed grant slot.

ARQ is preferably implemented only for data traffic that is tolerant of delay or latency. At a step 508 the subscriber unit determines if the transmitted data packet qualifies for ARQ. For example, a packet carrying voice over IP traffic will preferably not qualify since if such a packet is lost during transmission it would be less detrimental to voice quality to simply skip the lost packet rather than request retransmission. Thus if the packet does not qualify for ARQ, special ARQ handling terminates at step 510 and normal DOCSIS processing resumes. If the packet does qualify for ARQ, then it is stored in ARQ buffer 308 at a step 512.

Now subscriber unit 104 begins monitoring MAP messages to check for acknowledgment for successful receipt of the packets sent upstream in step 506. At a step 514, the subscriber unit 104 receives a MAP message. The subscriber unit 104 inspects the MAP message for acknowledgment of successful receipt of the data packet at step 516. If the MAP message includes this particular acknowledgement, this is another basis for termination of the ARQ procedure at a step 518. If the MAP message does not include an acknowledgment, then the subscriber unit 104 tests, at a step 520, if the time stamp of the MAP message indicates a time after the directed grant slot used to transmit the data packet. If this MAP message time stamp is before the time of the directed grant slot, there is a possibility that a later MAP message will include the acknowledgment and ARQ processing returns to step 514. If the MAP time stamp is after the directed grant slot, this means that the data packet was not successfully received, and the subscriber unit retransmits at step 522 after retrieving the data packet from ARQ buffer 308.

Figure 6:
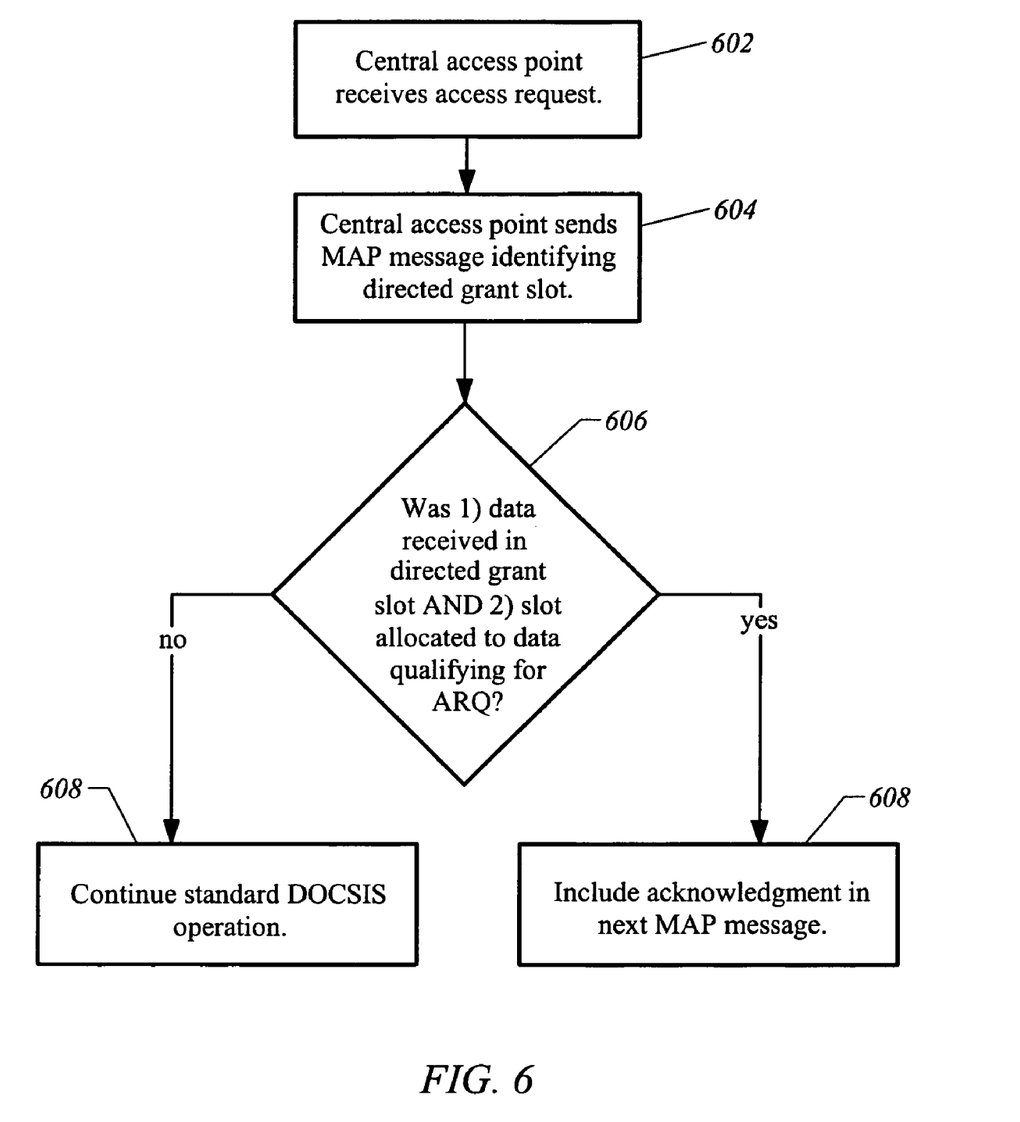
FIG. 6 is a flowchart of operating an ARQ scheme in a central access point according to one embodiment.

FIG. 6 is a flow chart describing steps of operating an ARQ scheme in central access point 102 according to one embodiment of the present invention. At step 602, central access point 102 receives an access request from subscriber unit 104 for time to be reserved to transmit data upstream. The access request originates with a particular service flow and includes the SID of that service flow. At step 604, the central access point sends a MAP message that includes an information element identifying a directed grant slot reserved for upstream data transmission by the requesting service flow Once the directed grant time slot is reached, a step 606 tests whether data was successfully received from the requesting subscriber unit 104 and whether this slot was in fact allocated to a service flow that sends data that qualifies for ARQ. For example, if the data packet belongs to a service flow supporting a voice call it will preferably not qualify for ARQ. If the data was not received during the directed grant slot successfully, or the slot was allocated to data not qualifying for ARQ, then standard DOCSIS operation continues at step 608. If the data was successfully received in the directed grant slot and the data qualifies for ARQ, then acknowledgment of successful receipt is included in the next MAP message.

It can be seen that an ARQ mechanism has been incorporated into DOCSIS v1.1 with minimal change to the protocol. This provides greater functionality in difficult communication channels including wireless channels suffering impairment such as noise and/or interference.

It is understood that the examples and embodiments that are described herein are for illustrative purposes only and various modifications are changes in light there of will be suggested to persons skilled in the art and are to be included within the spirit and purview of this application and scope of the appended claims and their full scope of equivalents. For example, the present invention may be applied to systems exploiting MAC protocols other than DOCSIS and into networks other then wireless networks. All publications, patents, and patent applications cited herein are hereby incorporated by reference.

The invention claimed is:

1. In a point to multipoint network operating according to a DOCSIS-based MAC protocol, a method for operating a subscriber unit, said method comprising:

transmitting data from the subscriber unit to a central access point during a directed grant slot allocated to said subscriber unit;

monitoring by the subscriber unit, MAP messages broadcast by said central access point to detect acknowledgment of receipt of said data;

if no acknowledgment of receipt is indicated by said MAP messages, retransmitting said data from the subscriber unit;

wherein non-receipt is indicated by said MAP messages if a MAP message is received with a timestamp later than said directed grant slot and no acknowledgement is received.

2. The method of claim 1 further comprising:
after transmitting said data to said central access point, storing said data in an ARQ buffer for possible retransmission.

3. The method of claim 2 wherein storing said data comprises storing said data only if communication of said data is delay tolerant.

4. In a point to multipoint network operating according to a DOCSIS-based MAC protocol, a method for operating a central access point, said method comprising:
receiving data from a subscriber unit at the central access point during a directed grant slot allocated to said subscriber unit; and
broadcasting a MAP message including an acknowledgment of receipt of said data;
only if said directed grant slot is allocated to data that qualifies for ARQ.

5. The method of claim 4 wherein said acknowledgment is included only if said data is delay tolerant.

6. The method of claim 4 further comprising:
prior to said directed grant slot, broadcasting another MAP message allocating said directed grant slot to said subscriber unit.

7. In a point to multipoint network operating according to a DOCSIS-based MAC protocol, apparatus for operating a subscriber unit, said apparatus comprising:
a MAC layer processor that transmits data to a central access point during a directed grant slot allocated to said subscriber unit and monitors MAP messages broadcast by said central access point to detect acknowledgment of receipt of said data; and
an ARQ buffer that stores said data after it is transmitted; and
wherein if no acknowledgment of receipt is indicated by said MAP messages, said MAC layer processor retrieves said data from said ARQ buffer and retransmits said data;
wherein non-receipt is indicated by said MAP messages if a MAP message is received with a timestamp later than said directed grant slot and no acknowledgement is received.

8. The apparatus of claim 7 wherein said ARQ buffer stores said data only if communication of said data is delay tolerant.

9. In a point to multipoint network operating according to a DOCSIS-based MAC protocol, an apparatus for operating a subscriber unit, said apparatus comprising:
a processor; and
a memory that stores computer executable instructions for execution by said processor, said computer executable instructions comprising:
code that causes transmission of data to a central access point during a directed grant slot allocated to said subscriber unit;
code that causes monitoring of MAP messages broadcast by said central access point to detect acknowledgment of receipt of said data;
code that causes, if no acknowledgment of receipt is indicated by said MAP messages, retransmission of said data; and
code that causes an indication by said MAP messages of non-receipt if a MAP message is received with a timestamp later than said directed grant slot and no acknowledgement is received.

10. The apparatus of claim 9 wherein said code that causes storing of said data causes storing of said data only if communication of said data is delay tolerant.

11. The apparatus of claim 9 further comprising code that causes, after transmission of said data to said central access point, storing of said data in an ARQ buffer for possible retransmission.

12. In a point to multipoint network operating according to a DOCSIS-based MAC protocol, an apparatus for operating a central access point, said apparatus comprising:
a processor; and
a memory that stores computer executable instructions for execution by said processor, said computer executable instructions comprising:
code that causes reception of data from a subscriber unit during a directed grant slot allocated to said subscriber unit;
code that causes broadcasting of a MAP message including an acknowledgment of receipt of said data only if said directed grant slot is allocated to data that qualifies for ARQ.

13. The apparatus of claim 12 wherein said acknowledgment is included only if said data is delay tolerant.

14. The apparatus of claim 12 further comprising code that, prior to said directed grant slot, causes broadcasting of another MAP message allocating said directed grant slot to said subscriber unit.

* * * * *

UNITED STATES PATENT AND TRADEMARK OFFICE
CERTIFICATE OF CORRECTION

PATENT NO.       : 7,668,101 B1  
APPLICATION NO. : 11/374454  
DATED            : February 23, 2010  
INVENTOR(S)      : Raissinia et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 949 days.

Signed and Sealed this

Twenty-eighth Day of December, 2010

David J. Kappos  
*Director of the United States Patent and Trademark Office*